United States Patent [19]

Dath et al.

[11] Patent Number: 6,150,294
[45] Date of Patent: Nov. 21, 2000

[54] PRODUCTION OF CRYSTALLINE SILICATE CATALYST HAVING MONOCLINIC STRUCTURE

[75] Inventors: Jean-Pierre Dath, Beloeil; Luc Delorme, Waterloo; Jacques-François Grootjans, Leefdaal; Xavier Vanhaeren, Genval; Walter Vermeiren, Houthalen, all of Belgium

[73] Assignee: Fina Research, S.A., Feluy, Belgium

[21] Appl. No.: 09/206,209

[22] Filed: Dec. 5, 1998

[30] Foreign Application Priority Data

Dec. 5, 1997 [EP] European Pat. Off. .............. 97121379

[51] Int. Cl.[7] ...................................... B01J 29/40
[52] U.S. Cl. ................... 502/77; 502/60; 502/85; 502/86
[58] Field of Search ................... 502/77, 85, 86, 502/60

[56] References Cited

U.S. PATENT DOCUMENTS

| | | | |
|---|---|---|---|
| 4,772,456 | 9/1988 | DeClippeleir et al. .................. | 423/328 |
| 4,876,411 | 10/1989 | Bowes et al. ............................ | 585/533 |
| 4,954,243 | 9/1990 | Kuehl et al. ............................. | 208/120 |
| 5,874,647 | 2/1999 | McGhee et al. ......................... | 568/800 |

FOREIGN PATENT DOCUMENTS

| | | |
|---|---|---|
| 0 109 060 | 5/1984 | European Pat. Off. . |
| 9704871 | 2/1997 | WIPO . |

*Primary Examiner*—Tom Dunn
*Attorney, Agent, or Firm*—Jim D. Wheelington; M. Norwood Cheairs

[57] ABSTRACT

A process for producing a crystalline silicate catalyst having a monoclinic structure, the process comprising providing a crystalline silicate of the MFI-type having a silicon/aluminum atomic ratio lower than 80; treating the crystalline silicate with steam and thereafter leaching aluminum from the crystalline silicate by contact with an aqueous solution of a leachant to provide a silicon/aluminum atomic ratio in the catalyst of at least 80 whereby the catalyst has a monoclinic structure.

10 Claims, 5 Drawing Sheets

PRODUCTION OF CRYSTALLINE SILICATE CATALYST HAVING MONOCLINIC STRUCTURE

BACKGROUND TO THE INVENTION

The present invention relates to a process for producing a crystalline silicate catalyst having a monoclinic structure.

DESCRIPTION OF THE PRIOR ART

Crystalline silicates are well known for use as catalysts in organic chemistry, for example to convert long chain paraffins into lighter products, in particular in the catalytic dewaxing of petroleum feedstocks. Many crystalline silicates have been recognised in the art. An important class of medium pore crystalline silicates comprises crystalline silicates of the MFI-type. The three-letter designation "MFI" represents a particular crystalline silicate structure type as established by the Structure Commission for the International Zeolite Association. Examples of MFI-type crystalline silicates include the synthetic zeolite ZSM-5 and silicalite and other MFI-type crystalline silicates are known in the art.

U.S. Pat. No. 3,702,886 discloses a particular crystalline zeolite known as ZSM-5 which has orthorhombic symmetry. The later U.S. Pat. No. 4,061,724 discloses crystalline silicates of the silicalite type which also have an orthorhombic structure.

EP-A-0146524 and EP-A-0146525 disclose a process for preparing a crystalline silicate having monoclinic symmetry. The process comprises the step of calcining the crystalline silica in air for a period of at least three hours at a temperature of at least 500° C. The crystalline silicate is of the silicalite type having a silicon/aluminum atomic ratio of at least 80.

It is well known that in order to crystallise silicates of the MFI type, such silicates having a silicon/aluminum atomic ratio higher than 80, this requires the use of an organic nitrogen-containing template molecule to form the requisite crystalline silicate structure. The synthesis of such a high silicon/aluminum ratio crystalline silicate also requires high purity of the starting materials. It has been recognised in the art that MFI-type crystalline silicates can only be synthesized without such an organic template molecule over a limited chemical composition range corresponding to a silicon/aluminum atomic ratio of up to about 40. The organic template molecule requires to be burnt off at high temperature in order to recover microporous crystalline silicate. From a commercial and industrial point of view, it would be more economical and simpler to synthesize crystalline silicates without the requirement for such an organic template. Moreover, for many catalyst applications it is required to have a high Si/Al atomic ratio in the catalyst, which is greater than 80, often significantly greater than 80.

In addition, the known manufacturing processes for monoclinic crystalline silicates having high silicon/aluminum atomic ratios tend to require high temperatures for prolonged periods, yielding a growth in the crystallite size. Typically, the ultimate crystallite size is greater than 1 micron in average diameter, more typically greater than 2 microns in average diameter. Such increased sizes lead to reduced catalyst activity.

WO-A-97/04871 discloses the treatment of zeolite to improve its butene selectivity. In that process, a medium pore zeolite cracking catalyst is treated with steam followed by treatment in an acidic solution to improve its butene selectivity.

U.S. Pat. No. 5,043,307 discloses a modified crystalline aluminosilicate zeolite catalyst and its use in the production of lubes of high viscosity index. The catalyst is modified by use of a process in which an as synthesised crystalline aluminosilicate containing organic template material is steamed to decompose at least a portion of the template material and to extract aluminium from the zeolite. The zeolite is then contacted with a dealuminising agent which forms a water-soluble complex with aluminum to remove a further quantity of zeolitic aluminium from the zeolite. Since the zeolite contains the organic template, only the surface of the zeolite is so modified. The surface-modified zeolite (such as ZSM-5) has a silica/alumina ratio of up to 108. The catalyst is not disclosed as having utility in the catalytic cracking of olefins, in particular for the production of propylene. There is no disclosure of the crystalline structure of the zeolite before or after such modification.

A paper entitled "De-alumination of HZSM-5 zeolites: Effect of steaming on acidity and aromatization activity", de Lucas et al, Applied Catalysis A: General 154 1997 221–240, published by Elsevier Science B.V. discloses the conversion of acetone/n-butanol mixtures to hydrocarbons over such de-aluminated zeolites.

SUMMARY OF THE INVENTION

It is an object of the present invention to provide an improved process for producing a crystalline silicate catalyst which at least partially overcomes the technical problems identified above.

Accordingly, the present invention provides a process for producing a crystalline silicate catalyst having a monoclinic structure, the process comprising providing a crystalline silicate of the MFI-type having a silicon/aluminum atomic ratio lower than 80; treating the crystalline silicate with steam and thereafter leaching aluminum from the crystalline silicate by contact with an aqueous solution of a leachant to provide a silicon/aluminum atomic ratio in the catalyst of at least 80 whereby the catalyst has a monoclinic structure.

Preferably, in the steam treatment step the temperature is from 425 to 870° C., more preferably from 540 to 815° C., and at a water partial pressure of from 13 to 200 kPa.

Preferably, the aluminum is removed by leaching to form an aqueous soluble compound thereof by contacting the crystalline silicate with an aqueous solution of a complexing agent for aluminum which tends to form a soluble complex with alumina.

In accordance with the process of the invention, the starting crystalline silicate catalyst of the MFI-type has an orthorhombic symmetry and a relatively low silicon/aluminum atomic ratio which can have been synthesized without any organic template molecule and the final crystalline silicate catalyst has a relatively high silicon/aluminum atomic ratio and monoclinic symmetry as a result of the successive steam treatment and aluminum removal. After the aluminum removal step, the crystalline silicate may be ion exchanged with ammonium ions.

BRIEF DESCRIPTION OF THE DRAWINGS

The present invention will now be described in greater detail with reference to the accompanying drawings, in which.

DETAILED DESCRIPTION OF THE PREFERRED EMBODIMENTS

Figure 1:
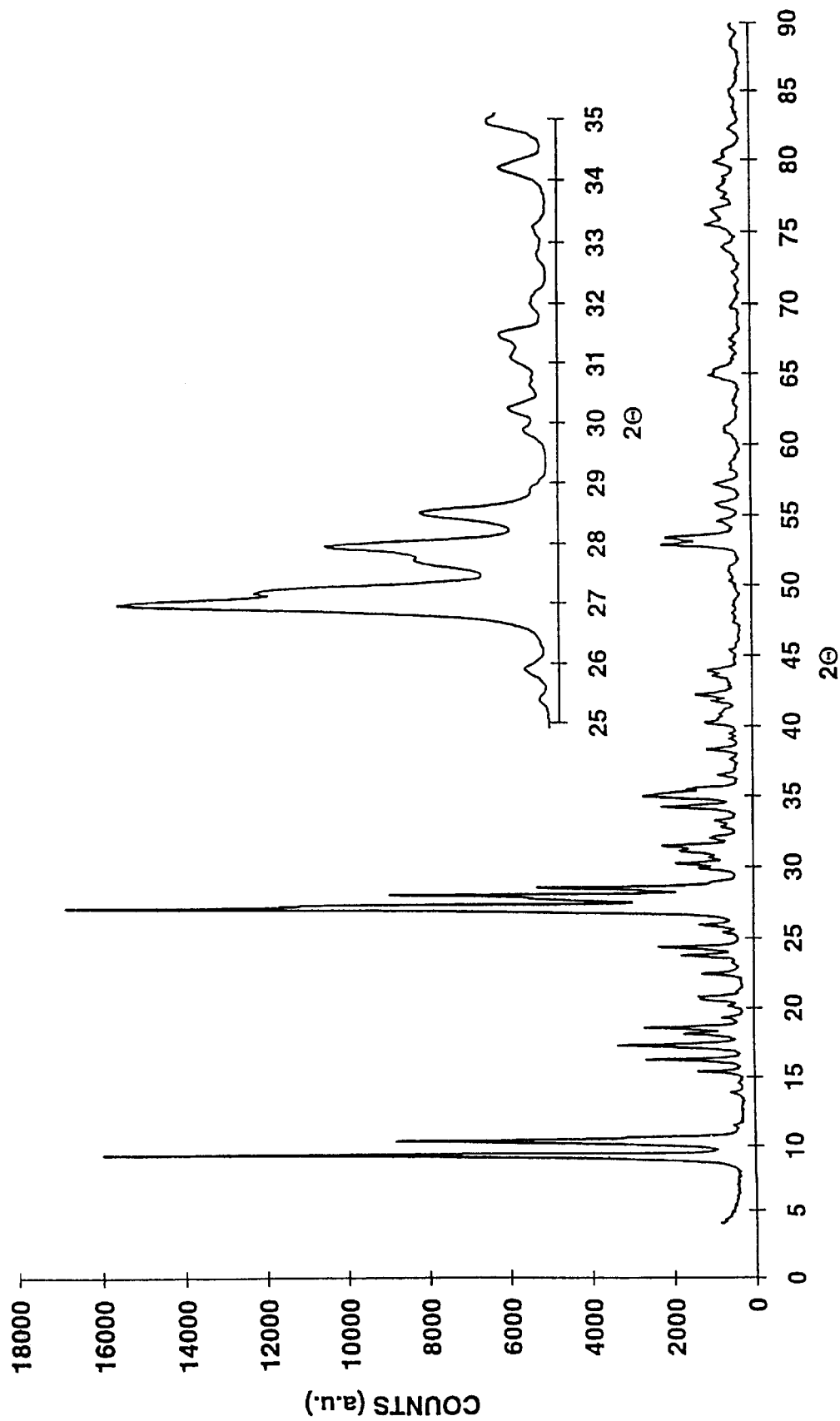
FIG. 1 is an x-ray diffraction diagram of an orthorhombic ZSM-5 type catalyst.

In the process of the invention, the initial crystalline silicate of the MFI-type has orthorhombic framework symmetry. It is known in the art that such MFI-type crystalline silicates exhibiting orthorhombic symmetry are in the space group Pnma. The x-ray diffraction pattern of such an orthorhombic structure has a peak at d=around 0.365 nm, d=around 0.305 nm and d=around 0.300 nm (see EP-A-0146524).

The starting crystalline silicate has a silicon/aluminum atomic ratio lower than 80. A typical ZSM-5 type catalyst has 3.08 wt % $Al_2O_3$, 0.062 wt % $Na_2O$, and is 100% orthorhombic. Such a catalyst has a silicon/aluminum atomic ratio of 26.9.

In the steam treatment step, the temperature is preferably from 420 to 870° C., more preferably from 540 to 815° C. A typical temperature is around 550° C. The pressure is preferably atmospheric pressure and the water partial pressure may range from 13 to 200 kPa. The steam atmosphere preferably contains from 5 to 100 vol % steam with from 0 to 95 vol % of an inert gas, preferably nitrogen. A more preferred atmosphere comprises 72 vol % steam and 28 vol % nitrogen i.e. 72 kPa steam at a pressure of one atmosphere. The steam treatment is preferably carried out for a period of from 1 to 200 hours, more preferably from 20 to 100 hours. A typical steaming period is around 48 hours. The steam treatment tends to reduce the amount of tetrahedral aluminum in the crystalline silicate framework by forming alumina.

In the aluminum leaching or extraction step, the complexing agent is preferably selected from organic acids such as citric acid, formic acid, oxalic acid, tartaric acid, malonic acid, succinic acid, glutaric acid, adipic acid, maleic acid, phthalic acid, isophthalic acid, fumaric acid, nitrilotriacetic acid, hydroxyethylenediaminetriacetic acid, ethylenediaminetetracetic acid, trichloroacetic acid and trifluoroacetic acid or salts thereof or a mixture of two or more of such acids or salts. The complexing agent preferably comprises an organic acid which forms a water-soluble complex with aluminum, and in particular removes alumina, which is formed during the steam treatment step, from the crystalline silicate by reaction of the complexing agent with the alumina to form an aqueous solution including a water-soluble complex of aluminum.

A particularly preferred complexing agent is an amine, and most preferably comprises ethylene diamine tetraacetic acid (EDTA) or salt thereof, in particular the sodium salt thereof.

Preferably, the complexing agent is a chelating agent or ligand which contains donor atoms that can combine by coordinated bonding with a single atom to form a cyclic structure called a chelating complex or a chelate.

In the aluminum leaching step, the crystalline silicate is immersed in the acidic solution or a solution containing the complexing agent and is then preferably heated, for example heated by reflux, for an extended period of time, for example 18 hours.

Following the aluminum leaching step, the crystalline silicate is subsequently washed, for example with distilled water, and then dried, preferably at an elevated temperature, for example around 110° C.

Optionally, the crystalline silicate is subjected to ion exchange with ammonium ions, for example by immersing the crystalline silicate in an aqueous solution of $NH_4Cl$. Such an ion exchange step is desirable if the amount of sodium ions present in the crystalline silicate is so high that formation of the monoclinic crystalline form is prevented.

Finally, the catalyst is calcined at an elevated temperature, for example at a temperature of at least 400° C. The calcination period is typically around 3 hours.

The resultant crystalline silicate has monoclinic symmetry, being in the space group $P2_1/n$. The x-ray diffraction diagram of the monoclinic structure exhibits three doublets at d=around 0.36, 0.31 and 0.19 nm. The presence of such doublets is unique for monoclinic symmetry. More particularly, the doublet at d=around 0.36, comprises two peaks, one at d=0.362 nm and one at d=0.365 nm. In contrast, the orthorhombic structure has a single peak at d=0.365 nm.

The presence of a monoclinic structure can be quantified by comparing the x-ray diffraction line intensity at d=around 0.36 nm. When mixtures of MFI-type crystalline silicates with pure orthorhombic and pure monoclinic structure are prepared, the composition of the mixtures can be expressed as a monoclinicity index (in %). The x-ray diffraction patterns are recorded and the peak height at d=0.362 nm for monoclinicity and d=0.365 nm for orthorhombicity is measured and are denoted as Im and Io respectively. A linear regression line between the monoclinicity index and the Im/Io gives the relation needed to measure the monoclinicity of unknown samples. Thus the monoclinicity index %=(a×Im/Io−b)×100, where a and b are regression parameters.

The present invention provides a number of technical advantages over the prior art. In accordance with the invention, the monoclinic crystalline silicate can be produced having a relatively high silicon/aluminum atomic ratio of at least 80 without using an organic template module. This is particularly important for crystalline silicate catalysts which are required to have a silicon/aluminum atomic ratio of greater than 80, which is necessary for certain catalyst applications of the monoclinic crystalline silicate. Furthermore, the present invention also provides the technical advantage that the crystallite size of the monoclinic crystalline silicate can be kept relatively low, typically less than 1 micron, more typically around 0.5 microns, since the starting crystalline silicate has low crystallite size which is not increased by the subsequent process steps. Accordingly, since the crystallite size can be kept relatively small, this can yield a corresponding increase in the activity of the catalyst. This is an advantage over known monoclinic crystalline silicate catalysts where typically the crystallite size is greater than 1 micron.

The monoclinic crystalline silicate catalyst made in accordance with the invention, and in particular having a high silicon/aluminum atomic ratio, e.g. at least about 180, has particular utility in a catalytic cracking process for olefin-containing hydrocarbon feedstocks wherein olefins in the feedstock are cracked to yield other olefins, generally of lower molecular weight and in particular propylene.

The present invention will now be described in greater detail with reference to the following non-limiting Examples.

EXAMPLE 1

A ZSM-5 type catalyst having a silicon/aluminum atomic ratio of 26.9 available in commerce from PQ Corporation of Southpoint, P.O. Box 840, Valley Forge, Pa. 19482-0840, USA, under the trade name CBV 5020 was treated at 550° C. with a steam atmosphere containing 72 vol % of steam and 28 vol % of nitrogen at atmospheric pressure (i.e. a steam pressure of 720 mbar). The treatment period was 48 hours. Thereafter 100 g of the steamed catalyst was immersed in 420 ml of an aqueous solution of 0.44 M citric acid. The resultant suspension was heated under reflux for a period of around 18 hours. The citric acid acted to remove aluminum from the catalyst. After the aluminum removal step the catalyst was washed with 5000 ml of distilled water, dried at 110° C. and calcined at a temperature of around 400° C. for a period of around 3 hours. The catalyst had an overall silicon/aluminum atomic ratio of 120. The aluminum removal treatment with citric acid was repeated again. The ultimate catalyst had a silicon/aluminum atomic ratio of 204, and a monoclinicity index of 100.

Figure 2:
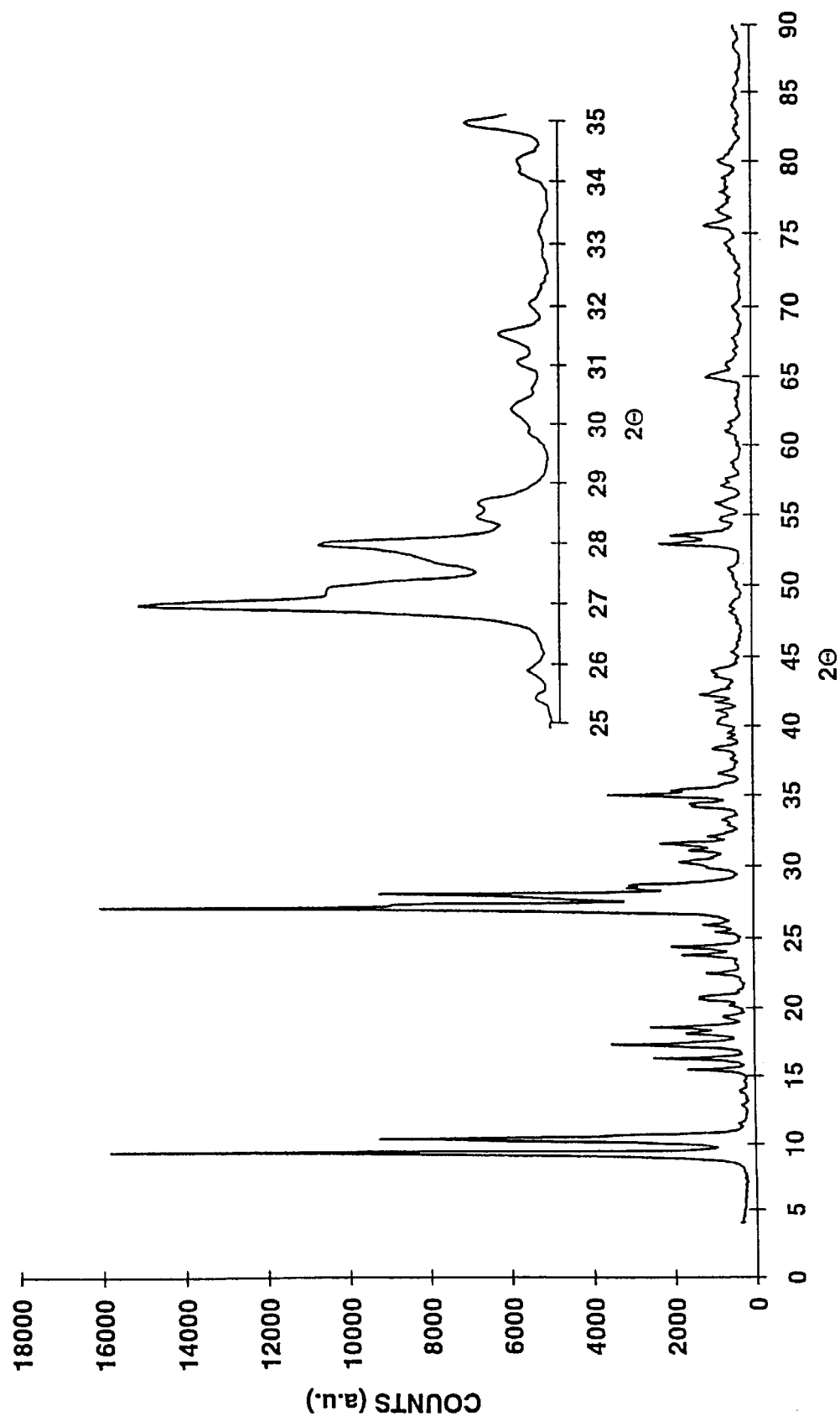
FIG. 2 is an x-ray diffraction diagram of a monoclinic ZSM-5 type catalyst which has been formed from the catalyst having the pattern illustrated in FIG. 1 in accordance with Example 1 of the method of the present invention.

FIG. 1 is an x-ray diffraction diagram, together with an enlargement of a portion thereof, for the starting ZSM-5 type catalyst. It may be seen that the x-ray diagram exhibits a single peak at around $2\theta=28.5$ and at around $2\theta=34.25$. The singlet peaks are indicative of an orthorhombic structure. In contrast, FIG. 2 is an x-ray diffraction diagram, together with an enlargement of a portion thereof, of the ultimate monoclinic catalyst. It may be seen that the diagram exhibits a doublet at around $2\theta=28.5$ and at around $2\theta=34.25$. These doublets are indicative of a monoclinic structure.

Figure 3:
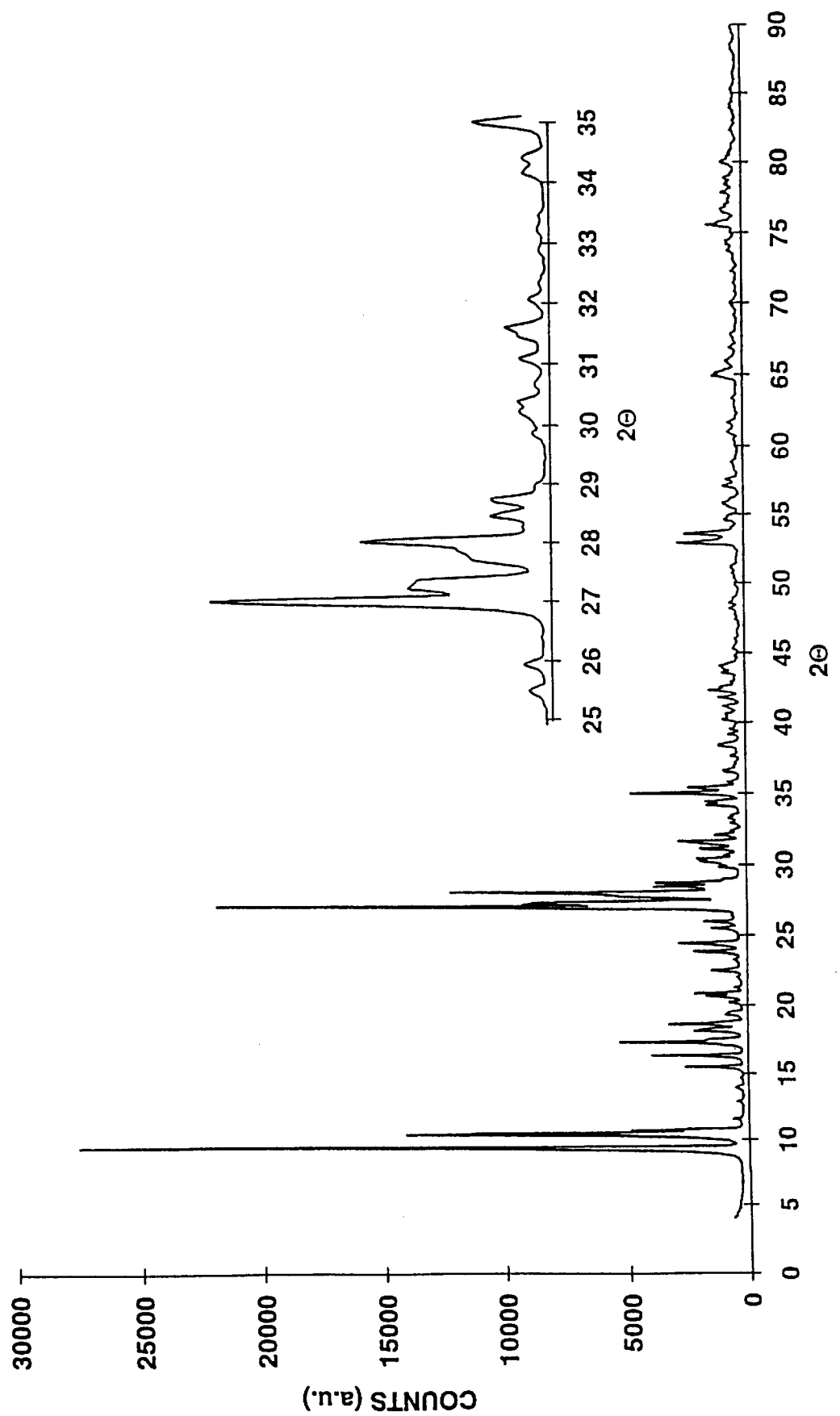
FIG. 3 is an x-ray diffraction diagram of another monoclinic ZSM-5 type catalyst made in accordance with an organic template method of the prior art.

FIG. 3 is an x-ray diffraction diagram of a monoclinic crystalline silicate produced in accordance with the prior art using an organic template to manufacture the monoclinic crystalline silicate. It may be seen from the diagram that the monoclinic crystalline silicate, like the ultimate crystalline silicate manufactured in accordance with Example 1, exhibits a doublet at around $2\theta=28.5$ and $2\theta=34.25$.

EXAMPLE 2

The ZSM-5 type catalyst employed in Example 1 was subjected to the same steam treatment as in Example 1. Thereafter 100 g of the steamed catalyst was immersed in 420 ml of an aqueous solution containing 0.22 M of $H_4EDTA$ and heated under reflux for a period of around 18 hours. The catalyst was then thoroughly washed with water, dried at 110° C. and calcined at a temperature of around 400° C. for a period of around 3 hours. The final catalyst had an overall silicon/aluminum atomic ratio of 145, with a monoclinicity index of 114.

Figure 4:
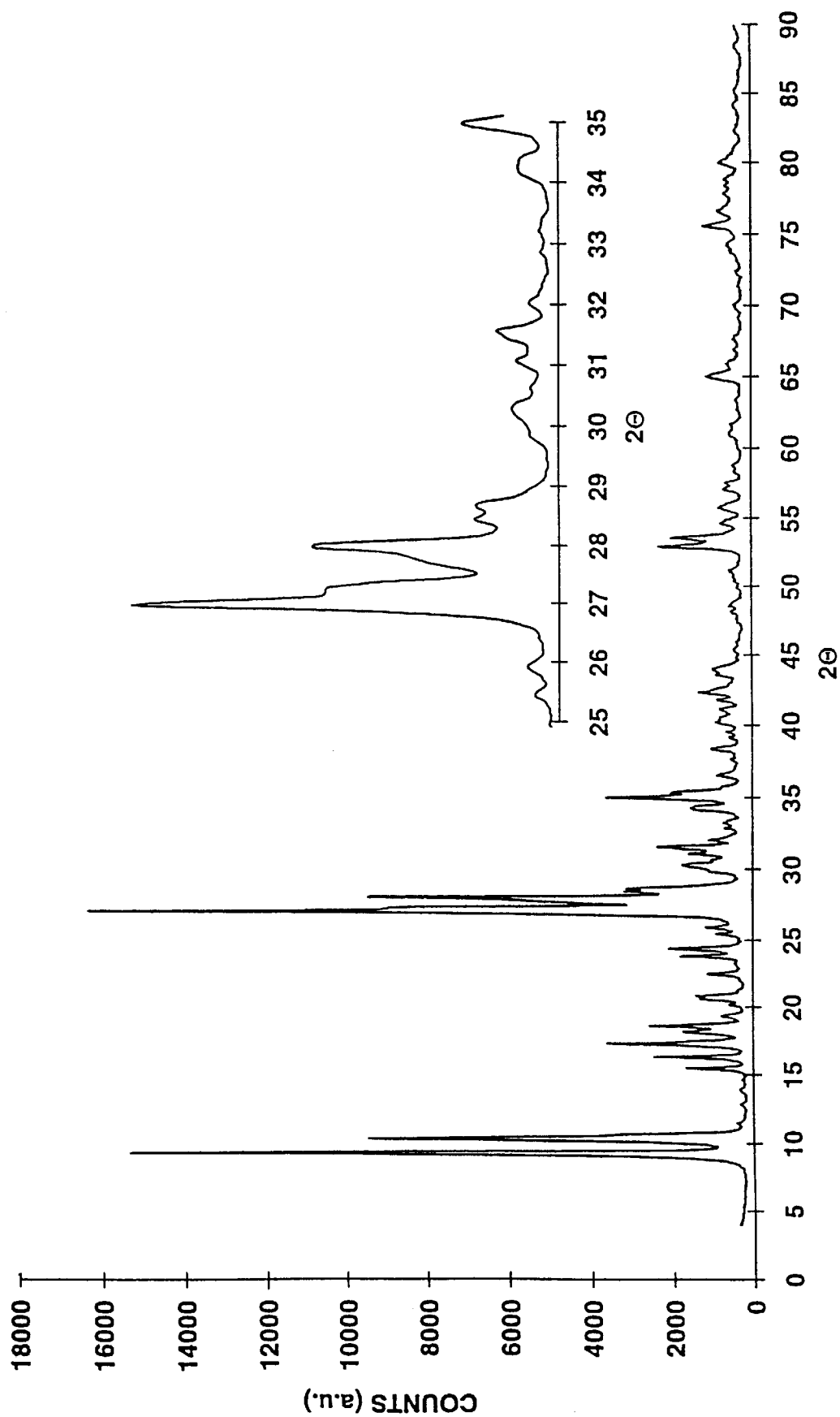
FIG. 4 is an x-ray diffraction diagram of another monoclinic ZSM-5 type catalyst made in accordance with Example 2 of the invention.

FIG. 4 is an x-ray diffraction diagram of the ultimate catalyst exhibiting doublets at around $2\theta=28.5$ and 34.25 demonstrating the monoclinicity of the catalyst.

EXAMPLE 3

The same ZSM-5 type catalyst employed in Example 1 was subjected to the same steam treatment as in Example 1. Thereafter 100 g of the steamed catalyst was immersed in 420 ml of an aqueous solution containing 0.22 M of citric acid. The suspension was then heated under reflux for a period of around 18 hours. The catalyst was then washed with 5000 ml of distilled water, dried at 110° C. and finally calcined at around 400° C. for a period of around 3 hours. The final obtained catalyst had an overall silicon/aluminum atomic ratio of 105, and a monoclinicity index of 99.

Figure 5:
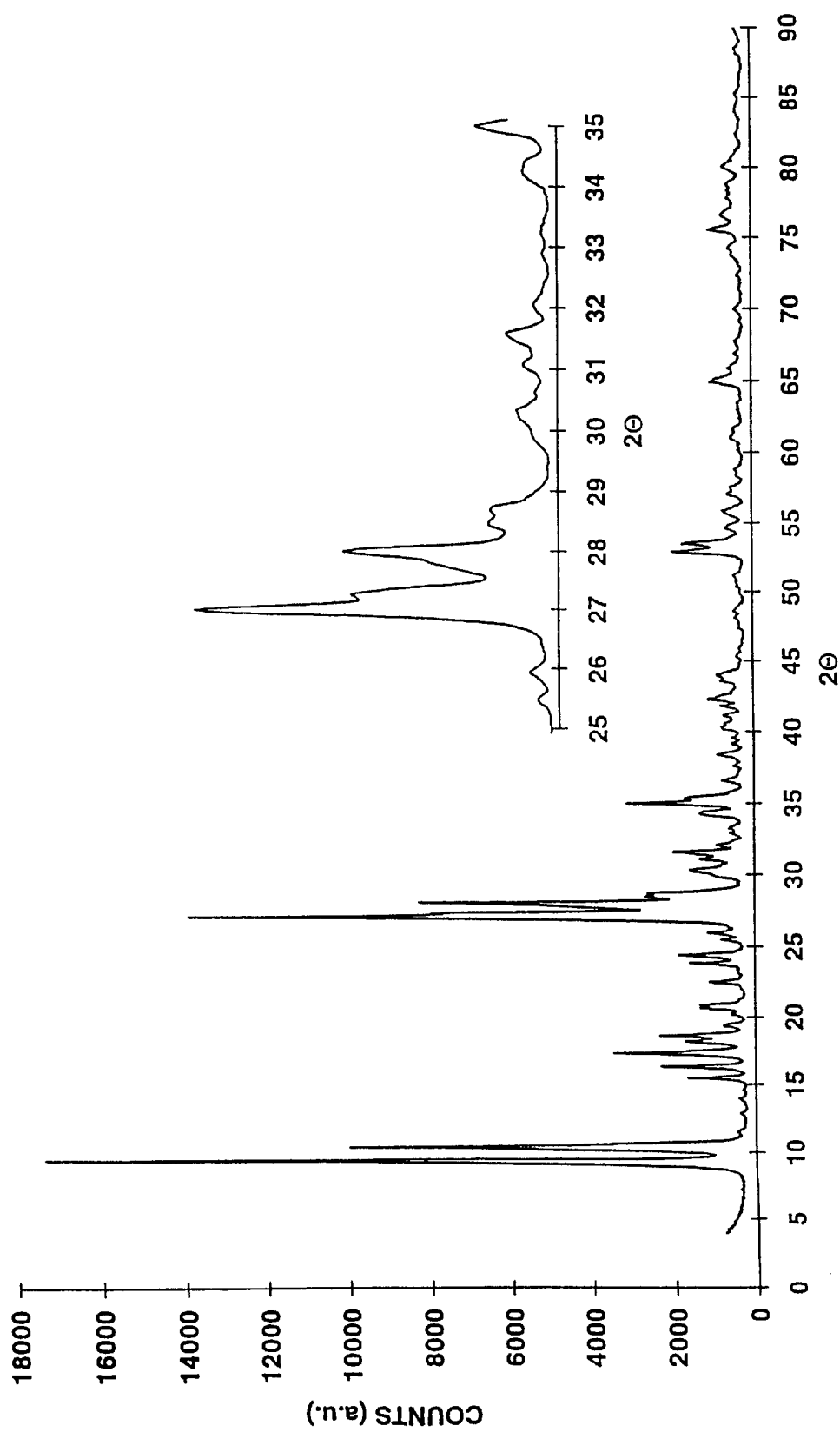
FIG. 5 is an x-ray diffraction diagram of another monoclinic ZSM-5 type catalyst made in accordance with Example 3 of the invention.

FIG. 5 is an x-ray diffraction diagram of the ultimate catalyst exhibiting doublets at around $2\theta=28.5$ and 34.25 demonstrating the monoclinicity of the catalyst.

What is claimed is:

1. A process for producing a crystalline silicate catalyst having a monoclinic structure, the process comprising providing a crystalline silicate of the MFI-type having a silicon/aluminum atomic ratio lower than 80; treating the crystalline silicate with steam and thereafter leaching aluminum from the crystalline silicate by contact with an aqueous solution of a leachant to provide a silicon/aluminum atomic ratio in the catalyst of at least 80 whereby the catalyst has a monoclinic structure.

2. A process according to claim 1 wherein in the steam treatment step the temperature is from 425 to 870° C. and the water partial pressure is from 13 to 200 kPa.

3. A process according to claim 2 wherein in the steaming treatment step the temperature is from 540 to 815° C.

4. A process according to claim 1 wherein in the leaching step the aluminum is removed by leaching to form an aqueous soluble compound thereof by contacting the crystalline silicate with an aqueous solution of a complexing agent for aluminum.

5. A process according to claim 4 wherein the complexing agent is selected from the group consisting of an organic acid selected from citric acid, formic acid, oxalic acid, tartaric acid, malonic acid, succinic acid, glutaric acid, adipic acid, maleic acid, phthalic acid, isophthalic acid, fumaric acid, nitrilotriacetic acid, hydroxyethylenediaminetriacetic acid, ethylenediaminetetracetic acid, trichloroacetic acid and trifluoroacetic acid, salts thereof and a mixture of at least two of such acids or salts.

6. A process according to claim 5 wherein the complexing agent for aluminum comprises the sodium salt of ethylenediaminetetraacetic acid.

7. A process according to claim 1 wherein in the aluminum leaching step the crystalline silicate and the aqueous solution of the leachant are heated under reflux.

8. A process according to claim 1 further comprising, after the leaching step, a step of subjecting the crystalline silicate to ion exchange with ammonium ions.

9. A process according to claim 8 wherein in the ion exchange step the crystalline silicate is immersed in an aqueous solution of ammonium chloride.

10. A process according to claim 1 further comprising the step of calcining the crystalline silicate catalyst following the leaching step at a temperature of at least 400° C.

* * * * *